(12) United States Patent
You (10) Patent No.: US 7,106,392 B2
(45) Date of Patent: Sep. 12, 2006

(54) STRUCTURE FOR MOUNTING FLAT PANEL DISPLAY

(75) Inventor: Dong Jae You, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/184,097

(22) Filed: Jun. 28, 2002

(65) Prior Publication Data

US 2003/0011550 A1    Jan. 16, 2003

(30) Foreign Application Priority Data

Jul. 10, 2001    (KR) .............................. P2001-41347

(51) Int. Cl.
*G02F 1/1333* (2006.01)
(52) U.S. Cl. .......................................... 349/58; 349/56
(58) Field of Classification Search .................. 349/58, 349/56, 60–65
See application file for complete search history.

(56) References Cited

U.S. PATENT DOCUMENTS

| | | | | |
|---|---|---|---|---|
| 5,666,172 A | * | 9/1997 | Ida et al. ....................... | 349/58 |
| 5,988,827 A | * | 11/1999 | Lee .............................. | 362/31 |
| 6,094,340 A | * | 7/2000 | Min ............................. | 361/681 |
| 6,104,451 A | * | 8/2000 | Matsuoka et al. ............ | 349/58 |
| 6,154,261 A | * | 11/2000 | Shim ........................... | 349/58 |
| 6,512,514 B1 | * | 1/2003 | Warashina et al. .......... | 345/206 |

* cited by examiner

*Primary Examiner*—Ahshik Kim
*Assistant Examiner*—Lisa M. Caputo
(74) *Attorney, Agent, or Firm*—McKenna Long & Aldridge LLP

(57) ABSTRACT

A structure for mounting a flat panel display module constituting a screen display device of a portable computer system wherein the weight and a thickness of a display device are reduced. For example, the structure for mounting a flat panel display includes a display module having a flat panel display panel, a backlight assembly, and a supporting member for supporting edges of the flat panel display panel and the back light assembly, a rear cover to which the display module is fitted, and a front cover fitted to a frontal edge of the rear cover to cover a frontal edge of the display module. In this structure the supporting member is formed at an inner side of the front cover.

15 Claims, 7 Drawing Sheets

STRUCTURE FOR MOUNTING FLAT PANEL DISPLAY

The present invention claims the benefit of Korean Patent Application No. P 2001-41347 filed on Jul. 10, 2001, which is hereby incorporated by reference in its entirety as if fully set forth herein.

BACKGROUND OF THE INVENTION

1. Field of the Invention

The present invention relates to a flat panel display and more particularly to a structure for mounting a flat panel display.

2. Discussion of the Related Art

In order to achieve small and lightweight systems such as a monitor of a desktop computer, a notebook computer, a portable computer, a personal digital assistant (PDA), and a portable telephone terminal, flat panel display devices are utilized. The flat panel display device may include a liquid crystal display (LCD), a plasma display panel (PDP), a field emission display (FED), and the like. Flat panel display devices have excellent visual perception, smaller power consumption, and produce less heat when compared to the cathode ray tube (CRT) devices. Accordingly, interest is high in the flat panel display device as being the next generation of display devices used in devices such as a portable telephone, a monitor of a computer, and a television.

The demand for lighter and smaller portable computer systems utilizing flat panel display devices is increasing. In response to this demand, various techniques have been developed for holding the flat panel display devices in systems.

Figure 1:
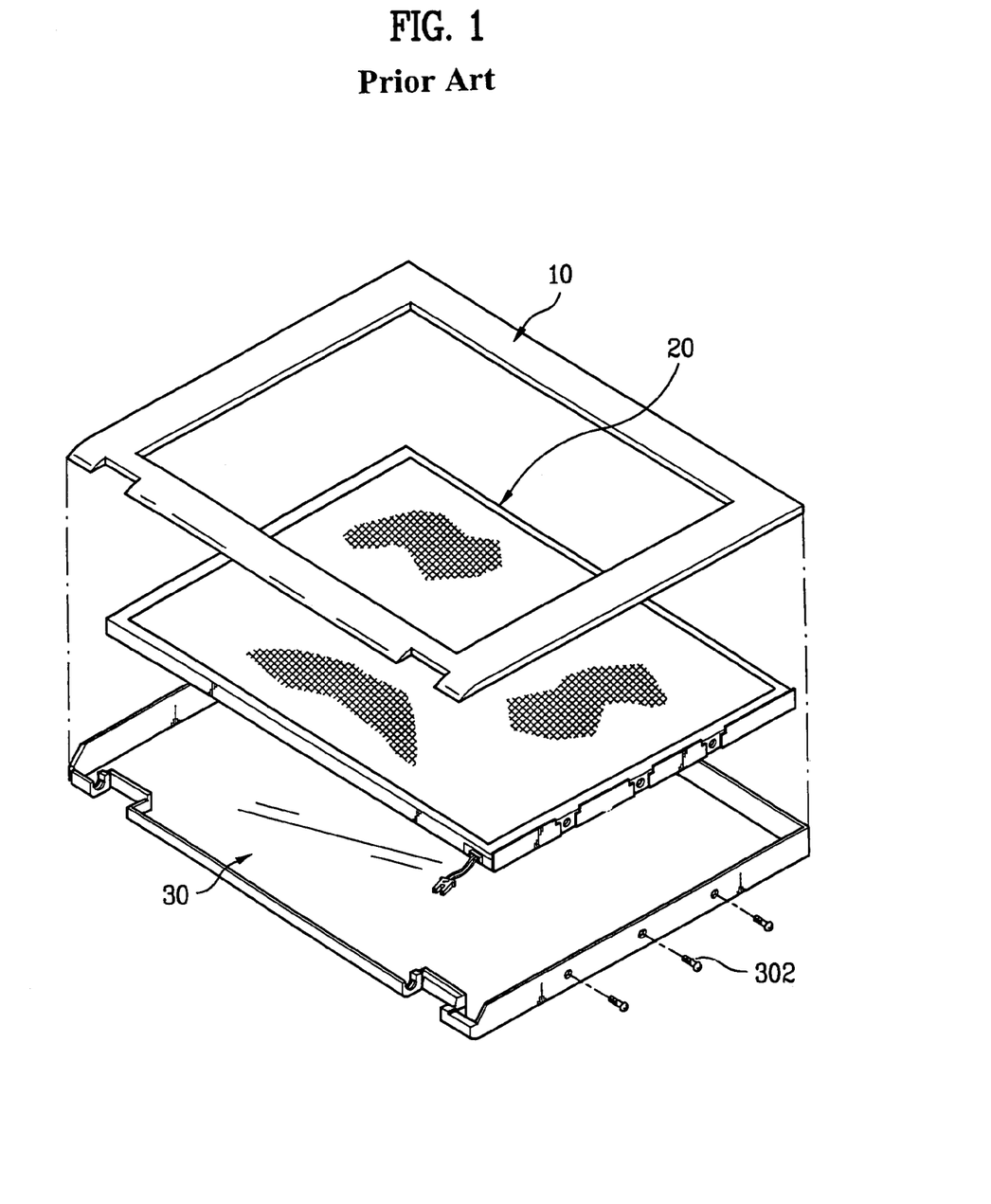
FIGS. 1 illustrates a perspective view of a prior art disassembled LCD device.
Figure 2A:
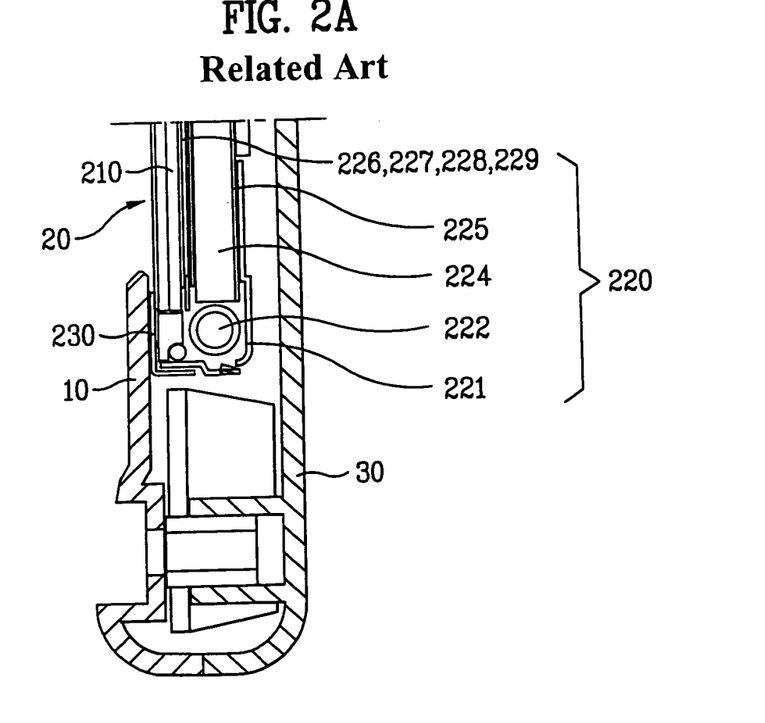
FIGS. 2A to 2B illustrate sectional views of the related art LCD device.
Figure 2B:
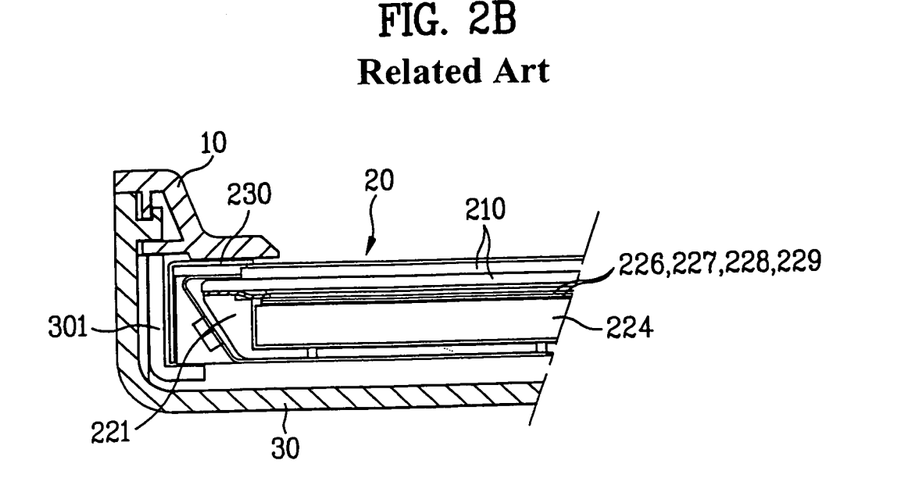
Figure 3:
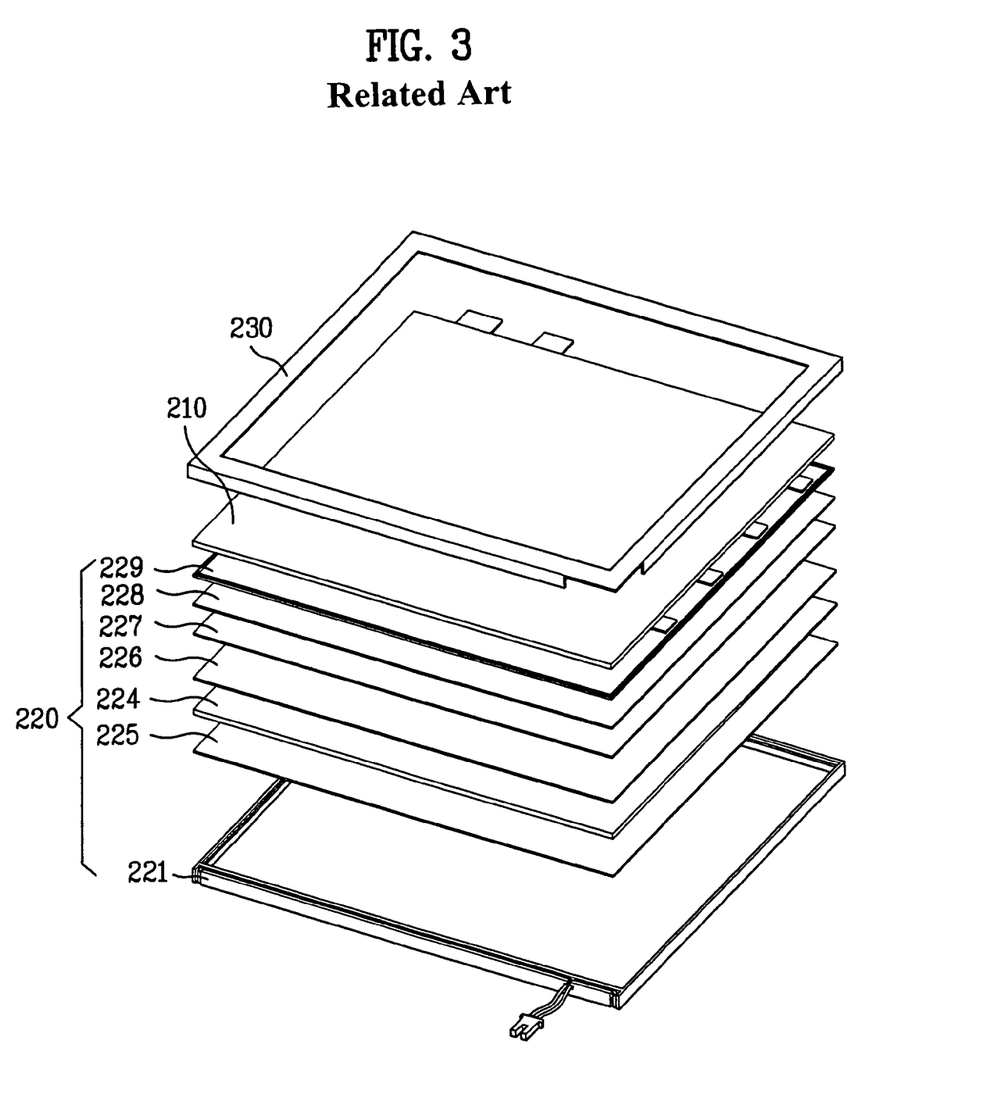
FIG. 3 illustrates perspective view showing a disassembled LCD module structure of an related art LCD device.
Figure 4:
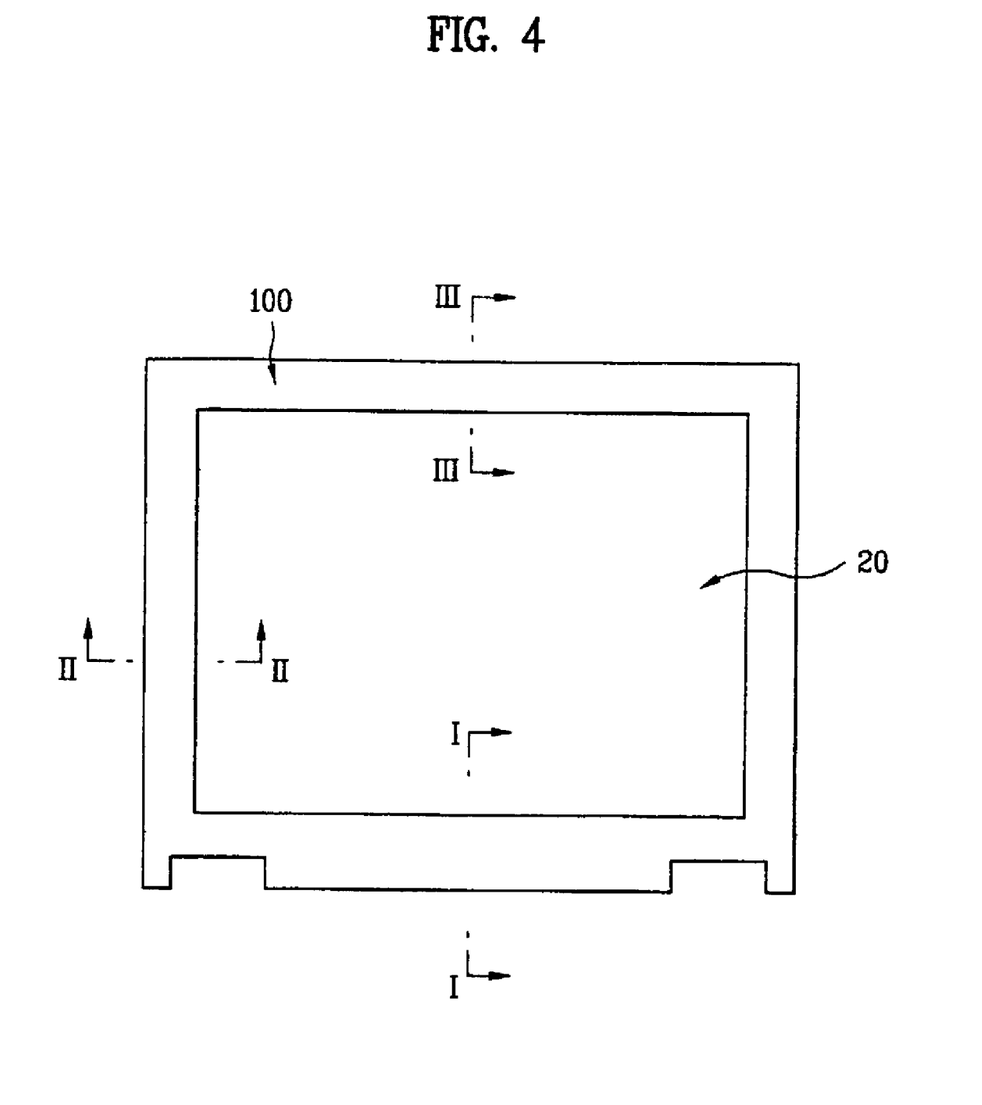
FIG. 4 illustrates a frontal view of an LCD device according to the present invention.
Figure 5:
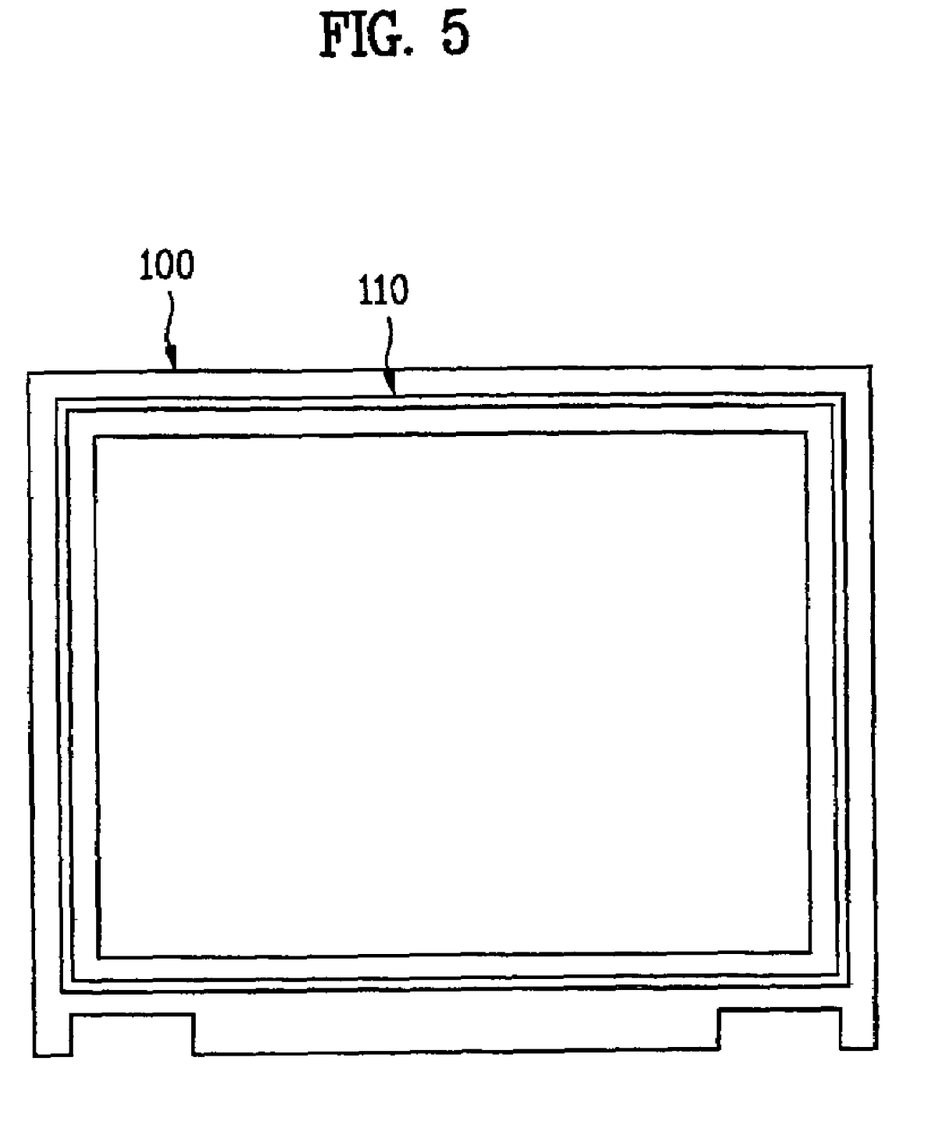
FIG. 5 illustrates a rear view of a front bezel according to the present invention.
Figure 6:
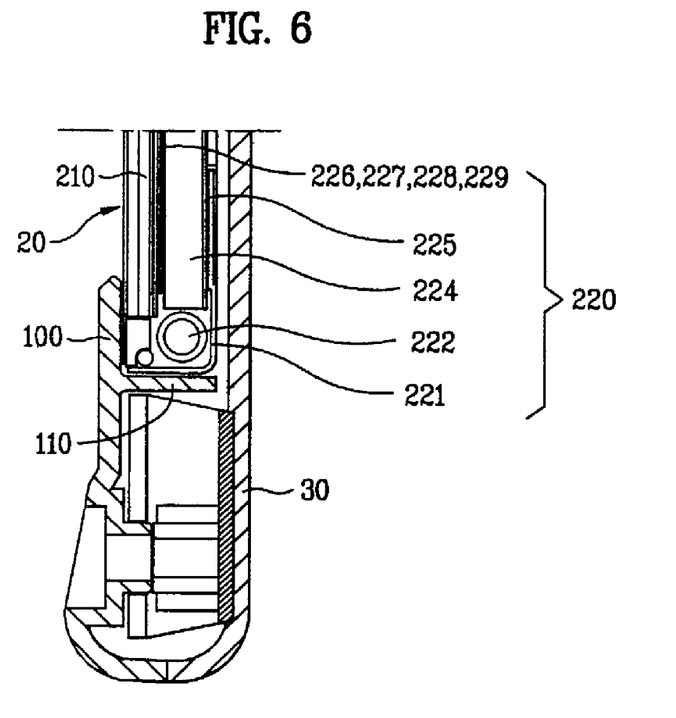
FIG. 6 illustrates a sectional view showing a structure for mounting an LCD device of FIG. 4, taken along line I—I of the present invention.
Figure 7:
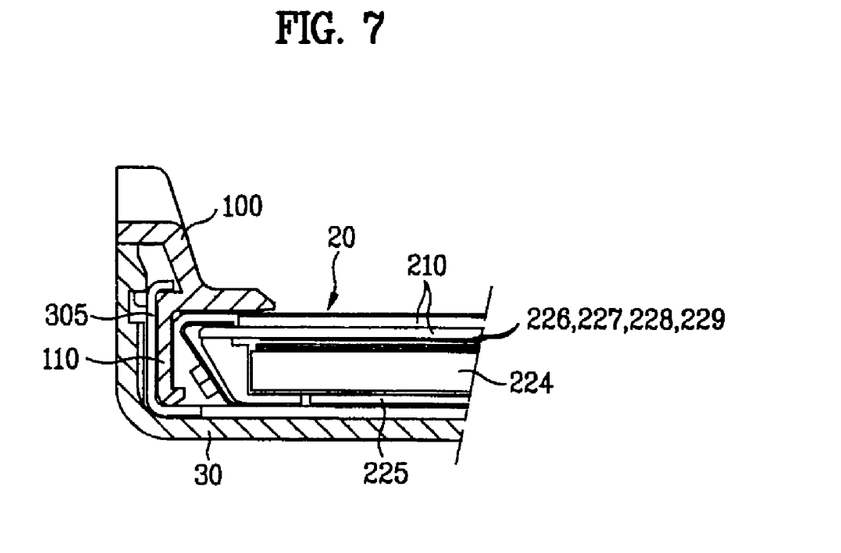
FIG. 7 illustrates a sectional view showing a structure for mounting an LCD device of FIG. 4, taken along line II—II of the present invention.
Figure 8:
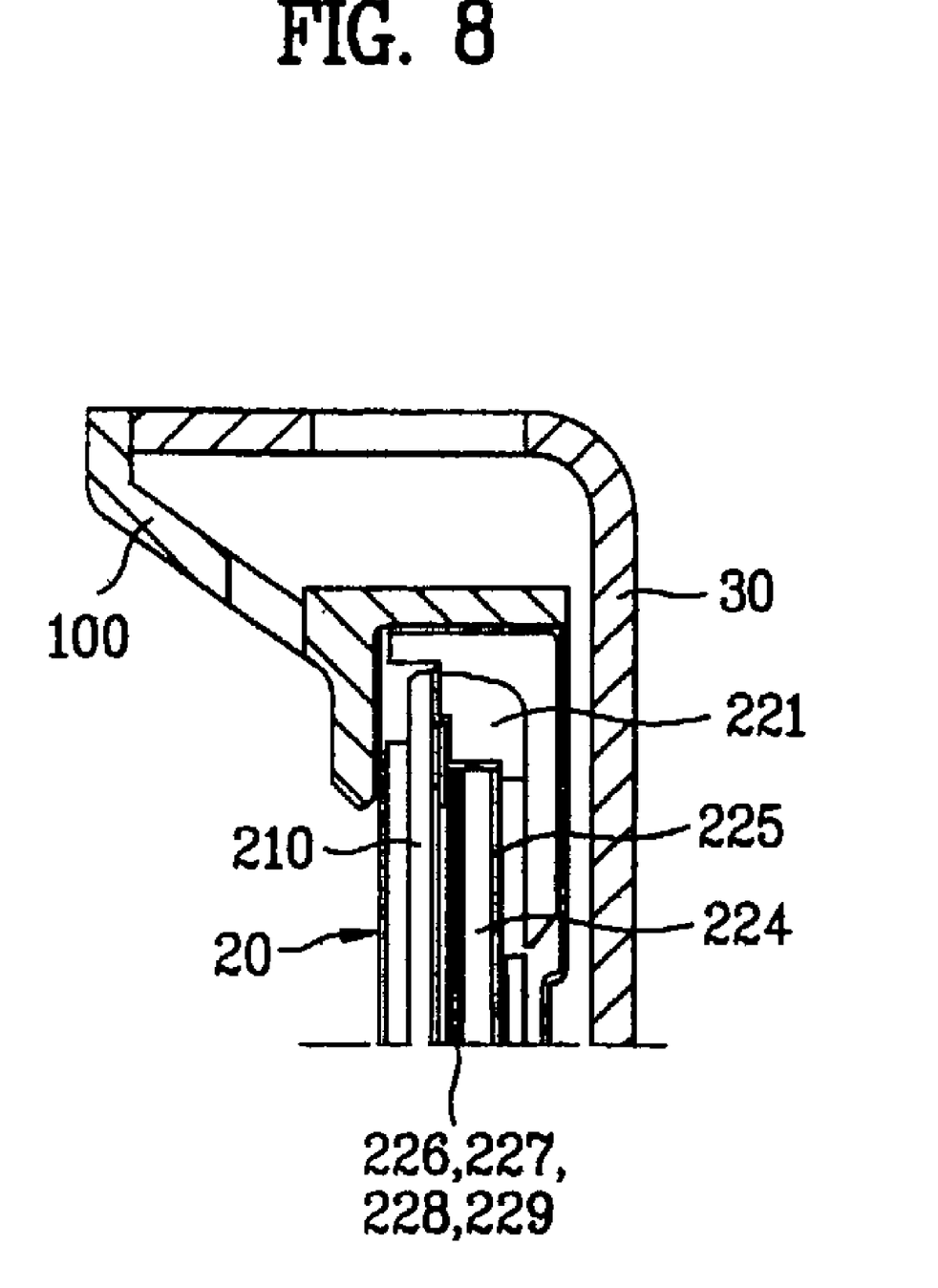
FIG. 8 illustrates a sectional view showing a structure for mounting an LCD device of FIG. 4, taken along line III—III of the present invention.

FIGS. 1 to 3, illustrate an LCD device used in a portable computer. The LCD device includes a rear cover 30 hinge-fitted to one end of a computer body (not shown). The computer body (not shown) has a calculation device, a memory device, a peripheral device, and a key pad of a portable computer. The LCD module 20 for displaying an image is attached to the rear cover 30. A front bezel 10 is attached to edges of the rear cover 30. In addition, the front bezel 10 covers edges of the LCD module 20 and supports the LCD module 20.

The LCD module 20 includes a liquid crystal (LC) panel 210 for outputting an image, a backlight assembly 220 under the LC panel 210 for emitting light, and a metallic sash 230. The metallic sash 230 has a square shape that cover the edges of the LC panel 210 and the backlight assembly 220. The metallic sash 230 is used for fixing the LC panel 210 to the backlight assembly 220.

The backlight assembly 220 includes spread sheets 226 and 229, prism sheets 227 and 228, a light-guiding plate 224, a reflection sheet 225, and a plastic mold frame 221 of a square shape having a lamp 222 emitting light at one side for supporting the components.

The metallic sash 230 holds the LCD device, LC panel 210 and the backlight assembly 220 together, thereby forming an LCD module 20. The LCD module 20 is attached to the rear cover 30 with screws and attached to the front bezel 10 and front side of the rear cover 30.

However, the related art LCD device has numerous problems. For example, the metallic sash 230 increases the weight of the LCD device. Additionally, the metallic sash 230 also increases the thickness of the LCD device and the stability of the LCD device is poor.

SUMMARY OF THE INVENTION

Accordingly, the present invention is directed to a structure for mounting flat panel displays that substantially obviates one or more of the problems due to limitations and disadvantages of the related art.

An advantage of the present invention is to provide a structure for mounting a flat panel display devices in which the weight, thickness and stability is improved.

Additional features and advantages of the invention will be set forth in the description which follows and in part will be apparent from the description or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a structure for mounting a flat panel display device includes a flat panel display module for outputting an image, a rear cover to which the display module is fitted, and a front cover fitted to a frontal side of the rear cover to cover front edges of the display module. Additionally, a supporting member for supporting each edge of the display module inside the front cover.

The display module includes an LC panel for outputting an image and a backlight assembly arranged under the LC panel for emitting light into the LC panel. The LC panel and the backlight assembly are not fixedly attached. Rather, they are arranged so that the supporting member of the front cover supports the LC panel and the backlight assembly.

In another aspect of the present invention, the supporting member performs the function of the related art metallic sash maybe formed in the front cover as a unit, thereby reducing an entire weight and a thickness of the LCD device.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

FIGS. 4 to 8 generally illustrate an LCD device including structures for mounting flat panel displays. The LCD device includes a rear cover 30 made of synthetic resin that maybe hinge-fitted to a notebook computer body (not shown). The notebook computer body (not shown) can include a calculation device, a memory device, a peripheral device, and a keyboard, and the like. The LCD module 20 for outputting an image is fitted to the rear cover 30. A front bezel 100 made of synthetic resin is fitted to a frontal edge of the rear cover 30 thereby covering an edge of the LCD module 20.

The LCD module 20 includes a liquid crystal (LC) panel 210 for outputting an image, spread sheets 226 and 229, prism sheets 227 and 228, light-guiding plate 224, a reflection sheet 225, a lamp 222, a mold frame of synthetic resin 221 of a rectangular shape for supporting the above components, and a backlight assembly 220 for emitting light to the LC panel 210. The LC panel 210 freely overlaps backlight assembly 220, rather than being fitted to the frontal view of the backlight assembly 220.

The LCD module 20 is arranged on the rear cover 30 and the front bezel 100. The front bezel 100 has a supporting member 110 protruding from an inner side of the bezel 100. The front bezel 100 and the supporting member 110 maybe formed as a unit that supports the edges of the LC panel 210 and the backlight assembly 220.

For example, the supporting member 110 and the inner surface of the front bezel 100 support the edges of the LC panel 210 and the backlight assembly 220. The front bezel 100 and the supporting member 110 may perform the same function of fixing the LC panel as the metallic sash 230 of the related art. For example, referring generally to FIG. 2 the metallic sash 230 fixes the LC panel 210 and the backlight assembly 220. While in the present invention, the supporting member 110 and the inner surface of the front bezel 100 support the LCD module and the backlight assembly 220.

In addition, as the supporting member 110 is constructed with synthetic resin and located on the outer side of the LCD module, therefore, the weight and thickness are reduced as compared to the related art device.

Optionally, the supporting member 110 may have curved or bent portions. When the LCD module 20 is located inside of the supporting member 210, the curved or bent portions may support the lower part of the LCD module 20. A superior support of the LCD module 20 is provided by preventing the LCD module 20 from being separated from the front bezel 100.

Alternatively, the supporting member 110 may be formed as a unit and/or formed with more than one part separated into more than one section. When the supporting member 110 of the front bezel 100 is formed into a plurality of sections the LCD module 20 is assembled easier.

A process for fabricating the LCD device is explained as follows.

The LC panel 210 is arranged on the backlight assembly 220 such that the LC panel 210 freely overlaps the backlight assembly 220. The front bezel 100 and the LCD module 20 are arranged so that the supporting member 110 may support the edges of the LC panel 210 and the backlight assembly 220.

A metallic reinforcing bracket 305 having, for example, a 'C' shape, is placed along an outer side of the supporting member 110, located at a side of the front bezel. In completing the fabrication the LCD device, the front bezel 100 is arranged on the rear cover 30 and screws 302 are inserted through holes in the side of rear cover 30 into the reinforcing bracket 305 and the front bezel 100. Alternatively, the screws may be inserted from holes in the back surface of the rear cover.

In addition, the aforementioned embodiments may also be applied to various devices such as a PDP device.

In summary, the aforementioned process and apparatuses reduce the weight and thickness of the display device when compared to the related art display devices.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
   a flat panel display module for displaying an image, wherein the flat panel display module has a top edge, a bottom edge and two side edges;
   a rear cover for fixing the flat panel display module, wherein the rear cover has a front side and a rear side;
   a front cover arranged on the front side of the rear cover and covering a frontal edge of the flat panel display module, wherein the front cover has an inner side; and
   a supporting member for supporting each edge of the flat panel display module, wherein the supporting member protrudes from the inner side of the front cover, wherein said supporting member is contiguously disposed around the inner side of the front cover.

2. The display device of claim 1, wherein the flat panel display module is an LCD module comprising:
   an LC panel for outputting an image;
   a backlight assembly formed at a rear side of the LC panel for emitting light into the LC panel;
   wherein the LC panel and the backlight assembly of the LCD module are not fixed together, but arranged freely and supported by the front cover supporting member.

3. The display device of claim 2, wherein the supporting member is formed as a unit along the inner side of the front cover.

4. The display device of claim 2, wherein the supporting member is divided into plural parts arranged along the inner side of the front cover.

5. A liquid crystal display (LCD) device comprising:
   a LCD module comprising a liquid crystal (LC) panel, spread sheets, prism sheets, a light-guiding plate, a reflection sheet, a lamp, a mold frame, and a backlight assembly wherein the LC panel and the backlight assembly are not fixedly attached together;
   a rear cover; and
   a front bezel including a supporting member protruding from a surface of the front bezel, the supporting member supporting side portions of the LCD module, wherein said supporting member is contiguously disposed about said front bezel;

wherein the front bezel supports an edge of the LCD module; and wherein the front bezel is arranged on the rear cover and the LCD module is arranged between the front bezel and the rear cover.

6. The liquid crystal display (LCD) device of claim 5, wherein the front bezel and the supporting member include synthetic resin.

7. The liquid crystal display (LCD) device of claim 6, wherein the supporting member is curved to an inner side of the front bezel.

8. The liquid crystal display (LCD) device of claim 7, wherein the supporting member has a portion curved to an inner side of the front bezel and an outer lower surface of the LCD module is supported by the curved portion.

9. The liquid crystal display (LCD) device of claim 8, wherein the front bezel is secured to sides of the rear cover with screws.

10. The liquid crystal display (LCD) device of claim 8, wherein the front bezel is secured to a back of the rear cover with screws into a reinforcing bracket.

11. The liquid crystal display (LCD) device of claim 8, wherein the front bezel is secured to a back of the rear cover with screws.

12. The liquid crystal display (LCD) device of claim 6, further comprising:

a reinforcing bracket arranged at an outer side of the supporting member.

13. The liquid crystal display (LCD) device of claim 12, wherein the reinforcing bracket has a "C" shape.

14. The liquid crystal display (LCD) device of claim 5, wherein the front bezel is formed as a single unit.

15. The liquid crystal display (LCD) device of claim 5, wherein the front bezel is formed with at least two parts.

* * * * *